(12) United States Patent
Zagato et al.

(10) Patent No.: US 12,234,907 B2
(45) Date of Patent: Feb. 25, 2025

(54) FLOATING OIL MANIFOLD FOR PLANETARY GEAR SYSTEMS

(71) Applicant: GE Avio S.r.l., Rivalta di Torino (IT)

(72) Inventors: Giulio Zagato, Moncalieri (IT); Leonardo Coviello, Bari (IT); Francesco Santacroce, Turin (IT); Cristiano Consales, Lecce (IT); Paolo Altamura, Monopoli (IT)

(73) Assignee: GE AVIO S.R.L., Rivalta di Torino (IT)

( * ) Notice: Subject to any disclaimer, the term of this patent is extended or adjusted under 35 U.S.C. 154(b) by 0 days.

(21) Appl. No.: 18/166,605

(22) Filed: Feb. 9, 2023

(65) Prior Publication Data
US 2024/0060559 A1     Feb. 22, 2024

(30) Foreign Application Priority Data

Aug. 17, 2022   (IT) .................. 102022000017376

(51) Int. Cl.
*F16H 57/04*     (2010.01)
*F02C 7/36*      (2006.01)

(52) U.S. Cl.
CPC .......... *F16H 57/0486* (2013.01); *F02C 7/36* (2013.01); *F16H 57/042* (2013.01); *F05D 2260/40311* (2013.01)

(58) Field of Classification Search
CPC .... F16H 57/04; F16H 57/0486; F16H 57/042; F02C 7/36; F05D 2260/40311
See application file for complete search history.

(56) References Cited

U.S. PATENT DOCUMENTS

| | | | |
|---|---|---|---|
| 3,539,035 A | * | 11/1970 | Wolkenstein ....... F16H 57/0482 184/6.12 |
| 4,373,622 A | | 2/1983 | Michael |
| 5,024,634 A | | 6/1991 | Blessing |

(Continued)

FOREIGN PATENT DOCUMENTS

| | | |
|---|---|---|
| EP | 2946095 A1 | 11/2015 |
| FR | 3127024 A1 | 3/2023 |

(Continued)

*Primary Examiner* — Woody A Lee, Jr.
*Assistant Examiner* — Joshua R Beebe
(74) *Attorney, Agent, or Firm* — Venable LLP; Edward A. Kmett; Michele V. Frank

(57) ABSTRACT

A planetary gear system includes a carrier including a first side having a first oil manifold opening therethrough, and a second side having a second oil manifold opening therethrough, a first oil manifold and a second oil manifold. The first oil manifold has a first flange portion floatingly engaging with the first oil manifold opening, and a second flange portion engaging with the second oil manifold opening of the carrier, the second flange portion including a first oil manifold mounting flange. The second oil manifold has a second oil manifold flange portion engaging with the second oil manifold opening of the carrier, and including a second oil manifold mounting flange. At least one connecting member connects the first oil manifold mounting flange and the second oil manifold mounting flange so as to mount the first oil manifold and the second oil manifold to the carrier.

20 Claims, 10 Drawing Sheets

(56) References Cited

U.S. PATENT DOCUMENTS

| | | | | |
|---|---|---|---|---|
| 5,702,320 | A * | 12/1997 | Brassai | F16H 57/0427 |
| | | | | 475/159 |
| 9,057,284 | B2 * | 6/2015 | Coffin | F02K 3/06 |
| 9,841,058 | B2 | 12/2017 | Sguotti et al. | |
| 9,945,259 | B2 | 4/2018 | Cigal et al. | |
| 10,526,960 | B2 | 1/2020 | Kojima et al. | |
| 10,823,083 | B2 * | 11/2020 | Gravina | F16H 57/0486 |
| 10,890,247 | B2 * | 1/2021 | Gravina | F16H 57/0456 |
| 11,073,044 | B2 | 7/2021 | DiBenedetto | |
| 11,231,104 | B2 | 1/2022 | Charrier et al. | |
| 11,808,213 | B2 * | 11/2023 | Mouly | F16H 57/043 |
| 2017/0307062 | A1 * | 10/2017 | Cipolla | F02C 7/36 |
| 2020/0165979 | A1 | 5/2020 | Morelli et al. | |
| 2020/0166118 | A1 * | 5/2020 | Di Giovanni | F16H 57/0482 |
| 2021/0164396 | A1 | 6/2021 | Morreale et al. | |
| 2021/0231029 | A1 | 7/2021 | Shirakawa et al. | |
| 2021/0239013 | A1 * | 8/2021 | Simard-Bergeron | |
| | | | | F16H 57/0479 |
| 2022/0397040 | A1 * | 12/2022 | Molesini | F16H 57/0427 |

FOREIGN PATENT DOCUMENTS

| | | |
|---|---|---|
| FR | 3127025 A1 | 3/2023 |
| FR | 3129436 A1 | 5/2023 |
| FR | 3129690 A1 | 6/2023 |
| FR | 3130747 A1 | 6/2023 |
| FR | 3130875 A1 | 6/2023 |
| GB | 790206 A | 2/1958 |

\* cited by examiner

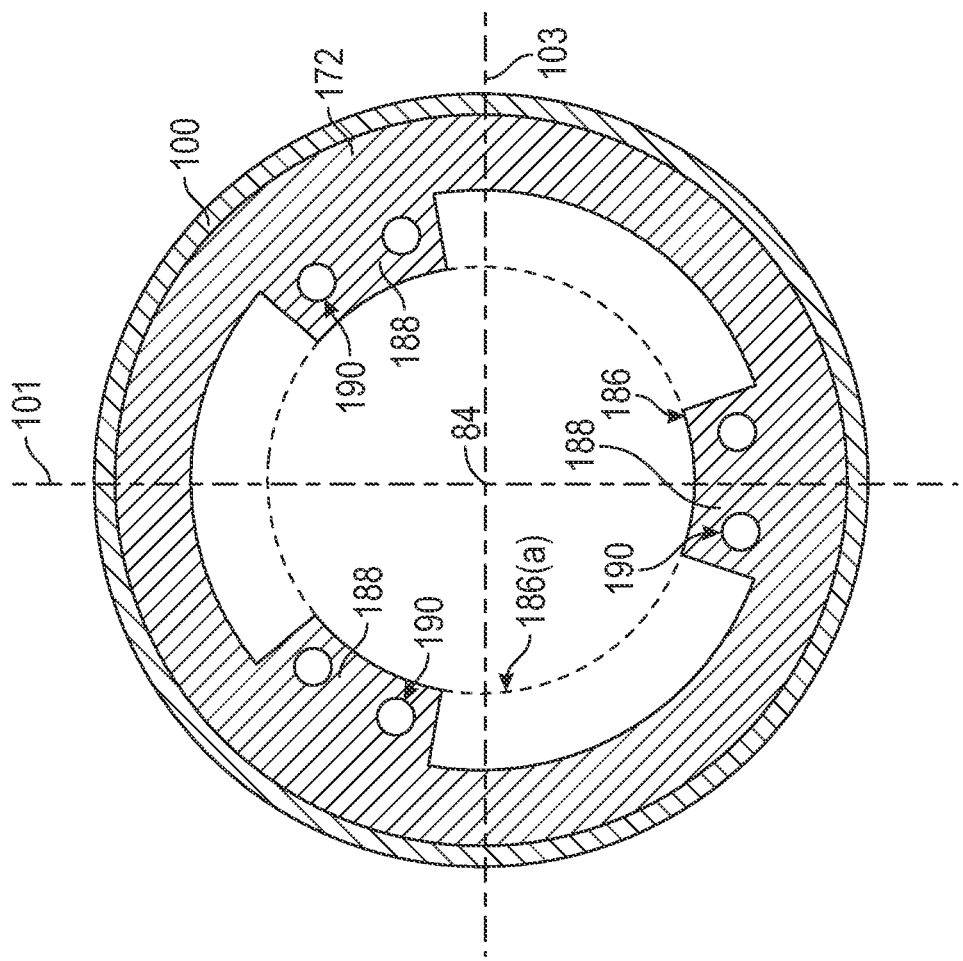
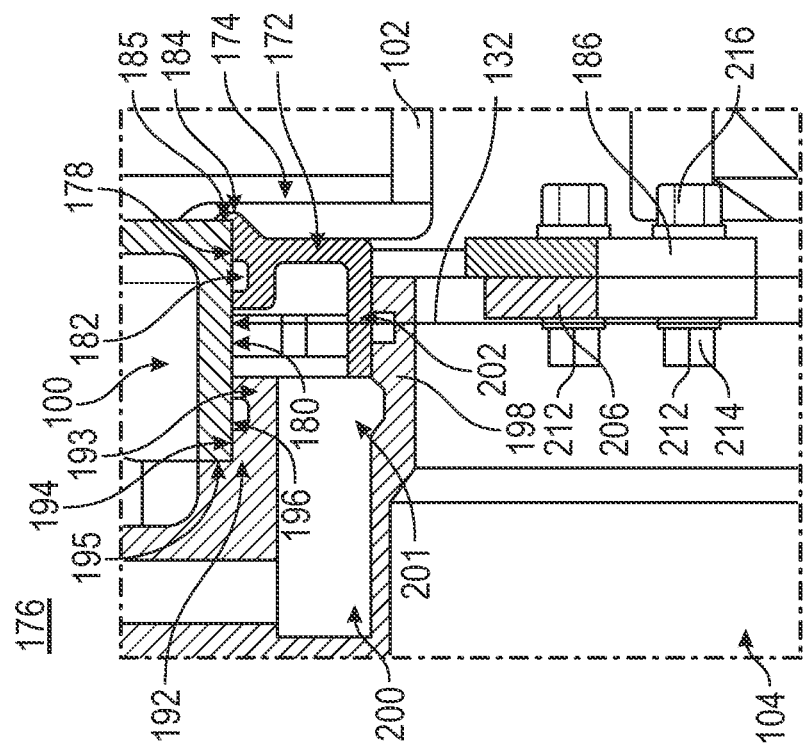
FIG. 11
FIG. 10

FLOATING OIL MANIFOLD FOR PLANETARY GEAR SYSTEMS

CROSS REFERENCE TO RELATED APPLICATIONS

The present application claims the benefit of Italian Patent Application No. 102022000017376, filed on Aug. 17, 2022, which is hereby incorporated by reference herein in its entirety.

TECHNICAL FIELD

The present disclosure relates to an oil manifold for a planetary gear system in a gas turbine engine.

BACKGROUND

Gas turbine engines are known to include a planetary gear system that provides a speed reduction from an input shaft connected to a low-pressure turbine and an output shaft connected to a fan assembly. Planetary gear systems implemented in gas turbine engines typically include a sun gear connected to the input shaft, a plurality of planet gears connected to a carrier, and a ring gear. The sun gear is typically connected to the input shaft from the low-pressure turbine. In a star gear arrangement of a planetary gear system, the carrier having the planet gears mounted thereto is stationary, while the ring gear is arranged to rotate and is connected to the output shaft.

BRIEF DESCRIPTION OF THE DRAWINGS

Features and advantages of the present disclosure will be apparent from the following description of various exemplary embodiments, as illustrated in the accompanying drawings, wherein like reference numbers generally indicate identical, functionally similar, and/or structurally similar elements.

FIG. 10 is an enlarged view depicting engagement of the second flange portion of the first oil manifold and the second oil manifold, with the carrier, taken at detail view 176 of FIG. 4, according to an aspect of the present disclosure.

FIG. 11 is a partial cross-sectional view through the second flange portion of the first oil manifold, taken at plane 11-11 of FIG. 4, according to an aspect of the present disclosure.

DETAILED DESCRIPTION

Figure 1:
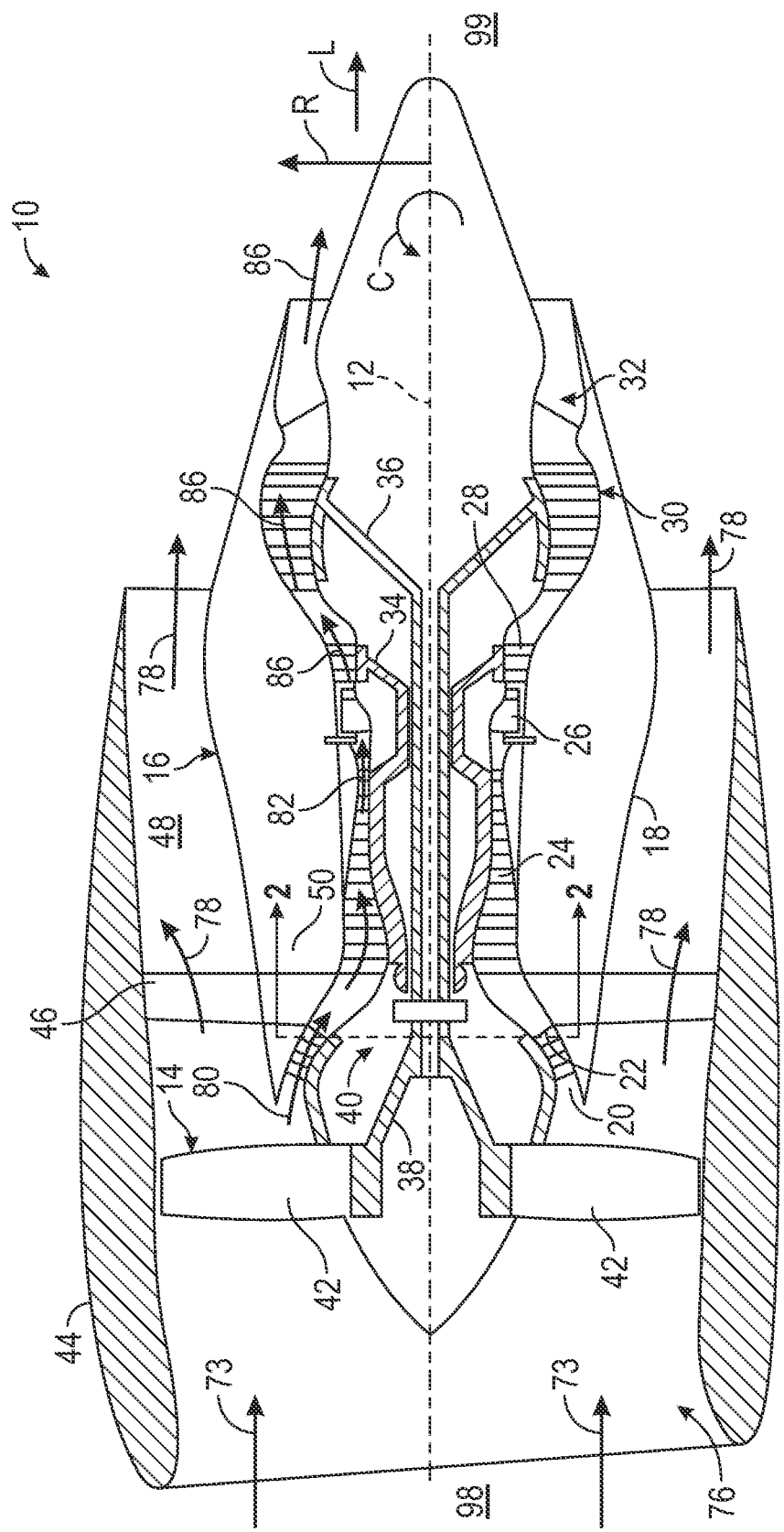
FIG. 1 is a schematic partial cross-sectional side view of an exemplary high by-pass turbofan jet engine, according to an aspect of the present disclosure.

Features, advantages, and embodiments of the present disclosure are set forth, or apparent from, a consideration of the following detailed description, drawings, and claims. Moreover, it is to be understood that the following detailed description is exemplary and intended to provide further explanation without limiting the scope of the disclosure as claimed.

Various embodiments are discussed in detail below. While specific embodiments are discussed, this is done for illustration purposes only. A person skilled in the relevant art will recognize that other components and configurations may be used without departing from the spirit and the scope of the present disclosure.

As used herein, the terms "first" and "second" may be used interchangeably to distinguish one component from another and are not intended to signify location or importance of the individual components.

The terms "upstream" and "downstream" refer to the relative direction with respect to fluid flow in a fluid pathway. For example, "upstream" refers to the direction from which the fluid flows, and "downstream" refers to the direction to which the fluid flows.

Gas turbine engines are known to include a planetary gear system that provides a speed reduction from an input shaft connected to a low-pressure turbine and an output shaft connected to a fan assembly. Planetary gear systems implemented in gas turbine engines typically include a sun gear connected to the input shaft, a plurality of planet gears connected to a carrier, and a ring gear. In a star gear arrangement, the carrier having the planet gears mounted thereto is stationary, while the ring gear is arranged to rotate and is connected to the output shaft. A first oil manifold may be connected to the carrier on an aft side of the carrier by being bolted to the carrier. A second oil manifold may be connected to the carrier on a forward side of the carrier by being bolted to the carrier. The bolting of the oil manifolds to the carrier requires additional machining processes to produce the carrier to include mounting bosses and/or threaded holes. In addition, the mounting hardware (e.g., bolts, washers and nuts) and the bosses add to the overall weight of the planetary gear system.

The present disclosure aims to simplify the machining processes by eliminating the mounting bosses, or by reducing the number of mounting bosses. In addition, the present disclosure aims to reduce the overall weight of the planetary gear system by reducing the number of mounting hardware elements required to mount the oil manifolds to the carrier. Thus, the present disclosure provides for a floating oil manifold system in which both the aft oil manifold and the forward oil manifold can be easily mounted to the carrier. The aft oil manifold may include a floating engagement on the aft side of the carrier, without the need for the aft oil manifold to be bolted to the aft side of the carrier. The mounting bosses on the aft side of the carrier can therefore be eliminated. The forward oil manifold may engage with the forward side of the carrier and may be connected with the aft oil manifold via mounting flanges. As a result, the aft and forward oil manifolds are permitted to float axially and radially within the carrier, rather than be hard mounted to the carrier.

Referring now to the drawings, FIG. 1 is a schematic partial cross-sectional side view of an exemplary high by-pass turbofan jet engine 10, herein referred to as "engine 10," as may incorporate various embodiments of the present disclosure. Although further described below with reference to a ducted turbofan engine, the present disclosure is also applicable to planetary gear systems in general, or to turbomachinery in general, including turbojet, turboprop, and turboshaft gas turbine engines, including marine and industrial turbine engines and auxiliary power units. In addition, the present disclosure is not limited to ducted fan type turbine engines, such as that shown in FIG. 1, but can be implemented in unducted fan (UDF) type turbine engines. As shown in FIG. 1, engine 10 has an axial centerline axis 12 that extends therethrough from an upstream end 98 to a downstream end 99 for reference purposes. The axial centerline axis 12 may define a longitudinal direction (L) of the engine 10, while a radial direction (R) extends outward from the axial centerline axis 12, and a circumferential direction (not shown) extends about the axial centerline axis 12.

In general, engine 10 may include a fan assembly 14 and a core engine 16 disposed downstream from the fan assembly 14. The core engine 16 may generally include an outer casing 18 that defines an annular inlet 20. The outer casing 18 encases, or at least partially forms, in serial flow relationship, a compressor section (22/24) having a low pressure (LP) compressor 22, a high pressure (HP) compressor 24, a combustor 26, a turbine section (28/30) including a high pressure (HP) turbine 28 and a low pressure (LP) turbine 30, and a jet exhaust nozzle section 32. A high pressure (HP) rotor shaft 34 drivingly connects the HP turbine 28 to the HP compressor 24. A low pressure (LP) rotor shaft 36 drivingly connects the LP turbine 30 to the LP compressor 22. The LP rotor shaft 36 may also be connected to a fan shaft 38 of the fan assembly 14 by way of a planetary gear system 40, which will be described in more detail below.

As shown in FIG. 1, the fan assembly 14 includes a plurality of fan blades 42 that are coupled to, and extend radially outwardly from, the fan shaft 38. An annular fan casing or a nacelle 44 circumferentially surrounds the fan assembly 14 and/or at least a portion of the core engine 16. In one embodiment, the nacelle 44 may be supported relative to the core engine 16 by a plurality of circumferentially spaced outlet guide vanes or struts 46. Moreover, at least a portion of the nacelle 44 may extend over an outer portion of the core engine 16 so as to define a bypass airflow passage 48 therebetween.

In operation, air 73 enters the nacelle 44 at a nacelle inlet 76, and a portion of the air 73 enters the compressor section (22/24) as a compressor inlet air flow 80, where the compressor inlet air flow 80 is compressed to form compressed air 82. Another portion of the air 73 enters the bypass airflow passage 48, thereby providing a bypass airflow 78. The compressed air 82 from the compressor section (22/24) enters the combustor 26, where the compressed air 82 is then mixed with fuel to generate a fuel and air mixture that is ignited and burned within the combustor 26 to generate combustion gases 86. The combustion gases 86 then flow further downstream into the HP turbine 28 and the LP turbine 30, thereby causing the HP rotor shaft 34 and the LP rotor shaft 36 to rotate. The rotation of the LP rotor shaft 36 also causes the fan shaft 38 to rotate via the planetary gear system 40. The combustion gases 86 then exit through the jet exhaust nozzle section 32.

Figure 2:
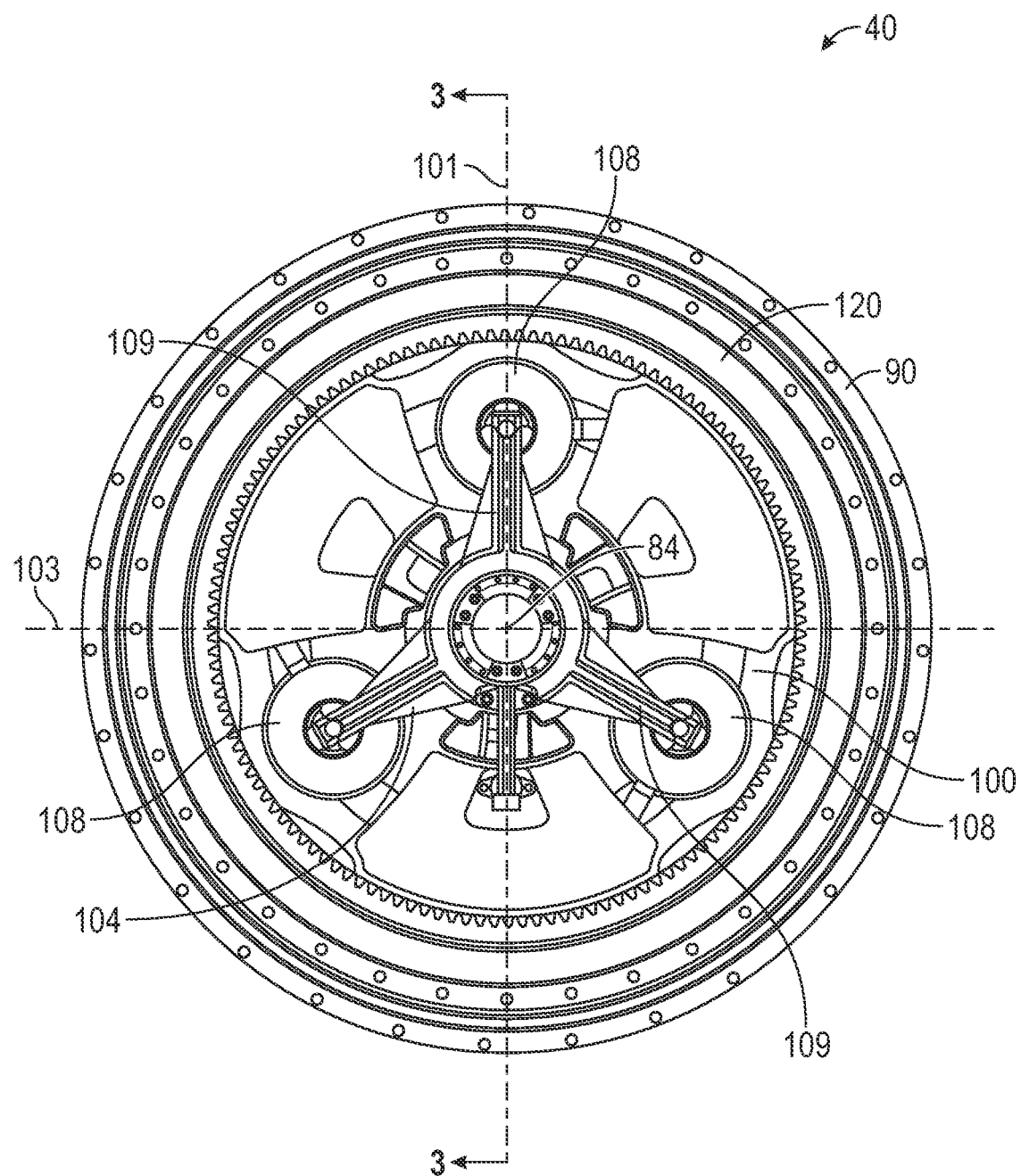
FIG. 2 is an aft looking view taken at plane 2-2 of FIG. 1 of an exemplary planetary gear system, according to an aspect of the present disclosure.
Figure 3:
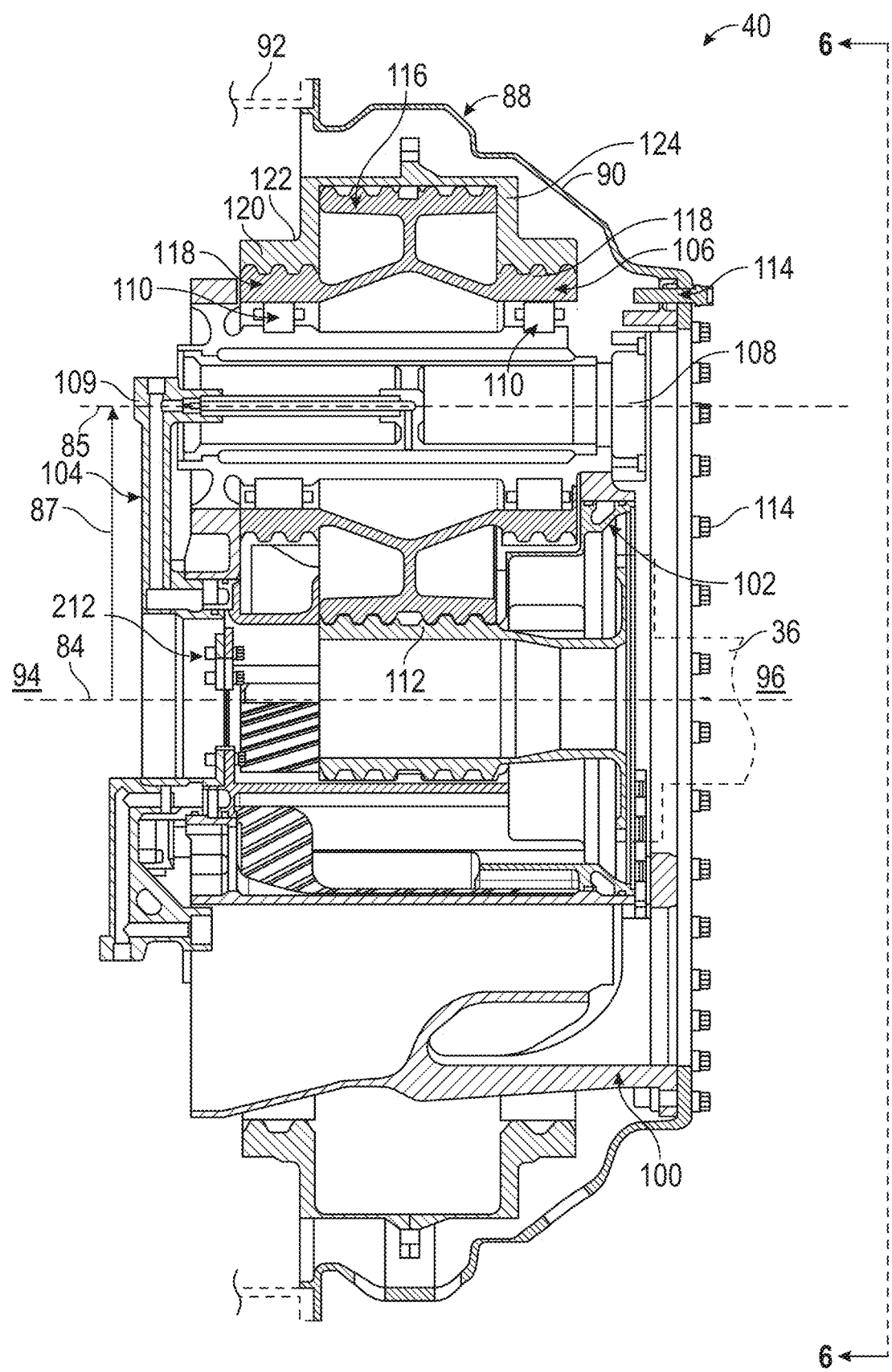
FIG. 3 is a partial cross-sectional view of the planetary gear system, taken at plane 3-3 of FIG. 2, according to an aspect of the present disclosure.

FIG. 2 is an aft looking view taken at plane 2-2 of FIG. 1 of the exemplary planetary gear system 40, according to an aspect of the present disclosure. FIG. 3 is a partial cross-sectional view of the planetary gear system 40, taken at plane 3-3 of FIG. 2, according to an aspect of the present disclosure. In FIG. 2, the planetary gear system 40 may define a system centerline axis 84 that may generally extend parallel to, or may be the same as, the axial centerline axis 12 (FIG. 1) of the engine 10 (FIG. 1). The planetary gear system 40 may also define a vertical reference plane 101 extending through the system centerline axis 84, and a horizontal reference plane 103 extending orthogonal to the vertical reference plane 101 and extending through the system centerline axis 84. Referring collectively to FIGS. 2 and 3, the planetary gear system 40 may be encased within a gearbox housing 88 that may include an aft housing portion 90 of the gearbox housing 88 on an aft side 96 of the planetary gear system 40, and a forward housing portion 92 (partially shown with dashed lines) of the gearbox housing 88 on a forward side 94 of the planetary gear system 40. In FIG. 2, the forward housing portion 92 of the gearbox housing 88 is removed to depict internal components of the planetary gear system 40, and in FIG. 3, only a portion of the forward housing portion 92 is depicted. The planetary gear system 40 includes a carrier 100, a first oil manifold 102 and a second oil manifold 104. The carrier 100 is shown as being mounted (i.e., bolted) to the aft housing portion 90 via bolts 114. Thus, the carrier 100 is mounted stationary within the planetary gear system 40. The first oil manifold 102 may also be referred to as an aft oil manifold, and the second oil manifold 104 may also be referred to as a forward oil manifold. The carrier 100, and the assembly of the first oil manifold 102 and the second oil manifold 104 to the carrier 100 will be described in more detail below.

The planetary gear system 40 also includes a plurality of planet gears 106 (only one shown in FIG. 3) that are each mounted with the carrier 100 via respective planet gear shafts 108. The planet gear shafts 108 define a planet gear centerline axis 85 therethrough, and each of the plurality of planet gear shafts 108 are arranged radially offset from the system centerline axis 84 by a radial distance 87 such that each of the planet gears 106 are radially offset from the system centerline axis 84. The second oil manifold 104 includes a plurality of oil distributing portions 109 that are connected with respective ones of the planet gear shafts 108 to provide oil thereto. Each planet gear shaft 108 may include bearings 110 that engage with the planet gear 106. Each planet gear 106 shown in FIG. 3 includes a sun gear portion 116 and a ring gear portion 118. The sun gear portion 116 of each planet gear 106 engages with a sun gear 112, which is coupled to the LP rotor shaft 36 such that, when the LP rotor shaft 36 rotates, the sun gear 112 drives the planet gears 106 to cause the planet gears 106 to rotate about the planet gear shaft 108. The ring gear portion 118 engages with a ring gear 120, which may include a forward ring gear portion 122 and an aft ring gear portion 124. When the sun gear 112 drives the planet gears 106, the planet gears 106 drive the ring gear 120 so as to rotate the ring gear 120 about the centerline axis 84 of the planetary gear system 40. While not shown in FIGS. 2 and 3, the ring gear 120 may be connected with the fan shaft 38 (FIG. 1) via a coupling shaft to drive the fan assembly 14 (FIG. 1).

Figure 4:
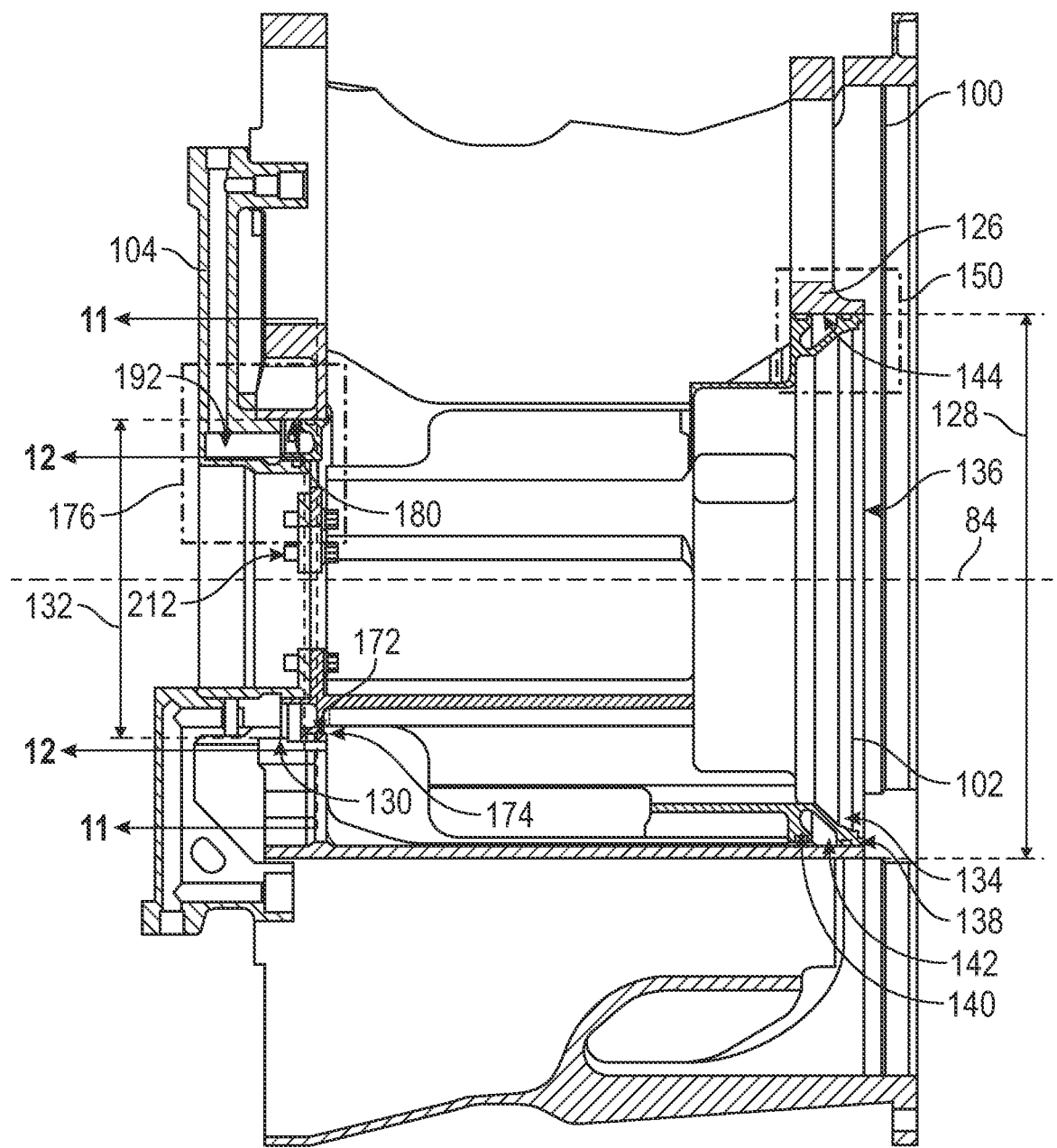
FIG. 4 is a partial cross-sectional view of an assembly of the carrier and first and second oil manifolds shown in FIG. 3, with the other planetary gear system components removed.

FIG. 4 is a partial cross-sectional view of an assembly of the carrier 100, the first oil manifold 102, and the second oil manifold 104 of FIG. 3, with the other planetary gear system components removed. The carrier 100 includes a first side 126 that includes a first oil manifold opening 128 therethrough. The first oil manifold opening 128 may be a circular opening that extends circumferentially about the system centerline axis 84. The carrier 100 also includes a second side 130 that has a second oil manifold opening 132 therethrough. The second oil manifold opening 132 may also be a circular opening that extends circumferentially about the system centerline axis 84. The first oil manifold 102 has a first flange portion 134 on a first end 136 (e.g., on an aft end) of the first oil manifold 102. The first flange portion 134 includes a first flange 138 and a second flange 140 defining an oil passageway 142 therebetween.

Figure 5:
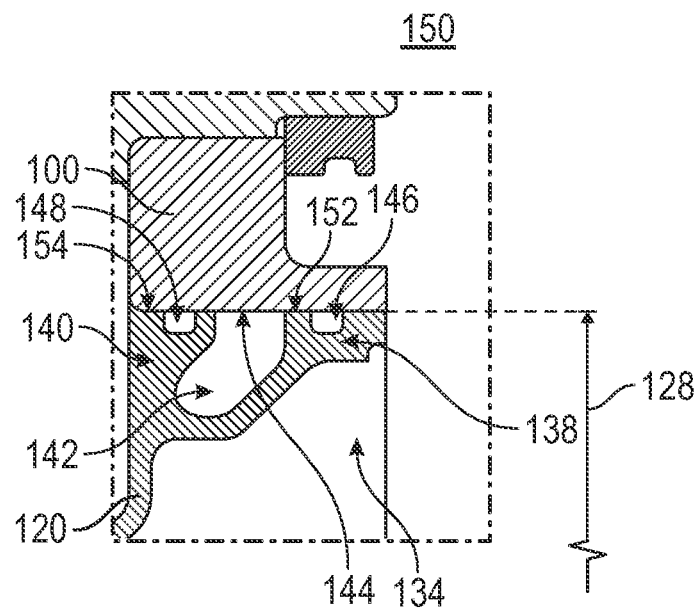
FIG. 5 is an enlarged view of a first flange portion of a first oil manifold, taken at detail view 150 of FIG. 4, according to an aspect of the present disclosure.

FIG. 5 is an enlarged view of the first flange portion 134 of the first oil manifold 102, taken at detail view 150 of FIG. 4. The first flange 138 and the second flange 140 engage with an inner surface 144 of the first oil manifold opening 128 (FIG. 4) of the carrier 100. The first flange 138 is sized diametrically so that an outer surface 152 of the first flange 138 provides for a slight clearance between the outer surface 152 of the first flange 138 and the inner surface 144 of the first oil manifold opening 128 of the carrier 100. Similarly, the second flange 140 is sized diametrically so that an outer surface 154 of the second flange 140 provides a slight clearance between the outer surface 154 of the second flange 140 and the inner surface 144 of the first oil manifold opening 128 of the carrier 100. The first flange 138 may include a seal groove 146 to accommodate an O-ring seal (not shown), and the second flange 140 may include a seal groove 148 to accommodate an O-ring seal (not shown) so as to seal the oil passageway 142. Thus, the first flange portion 134 floatingly engages with the first oil manifold opening 128 of the carrier 100. That is, the first flange portion 134, via the slight clearance between the first flange portion 134 and the inner surface 144 of the first oil manifold opening 128 is permitted to shift axially and radially with respect to the centerline axis 84, thereby forming a floating engagement with the carrier 100 at the first manifold opening 128. The floating engagement allows for thermal expansion/contraction between the first oil manifold 102 and the carrier 100, while at the same time, providing a sealed oil passageway 142. The first oil manifold 102 that is "floatingly" engaged with the carrier 100 implies that the first oil manifold—while engaged with the carrier—can grow in size relative to the carrier 100 when the two are made from material having different thermal expansion rates, but without inducing very high thermal stresses in the parts. The thermal growth of the manifold 102 or carrier 100 relative to the other is not constrained by the connection between the two, even when the two are made from the different material, because the manifold and the carrier are only floatingly engaged with each other.

Figure 6:
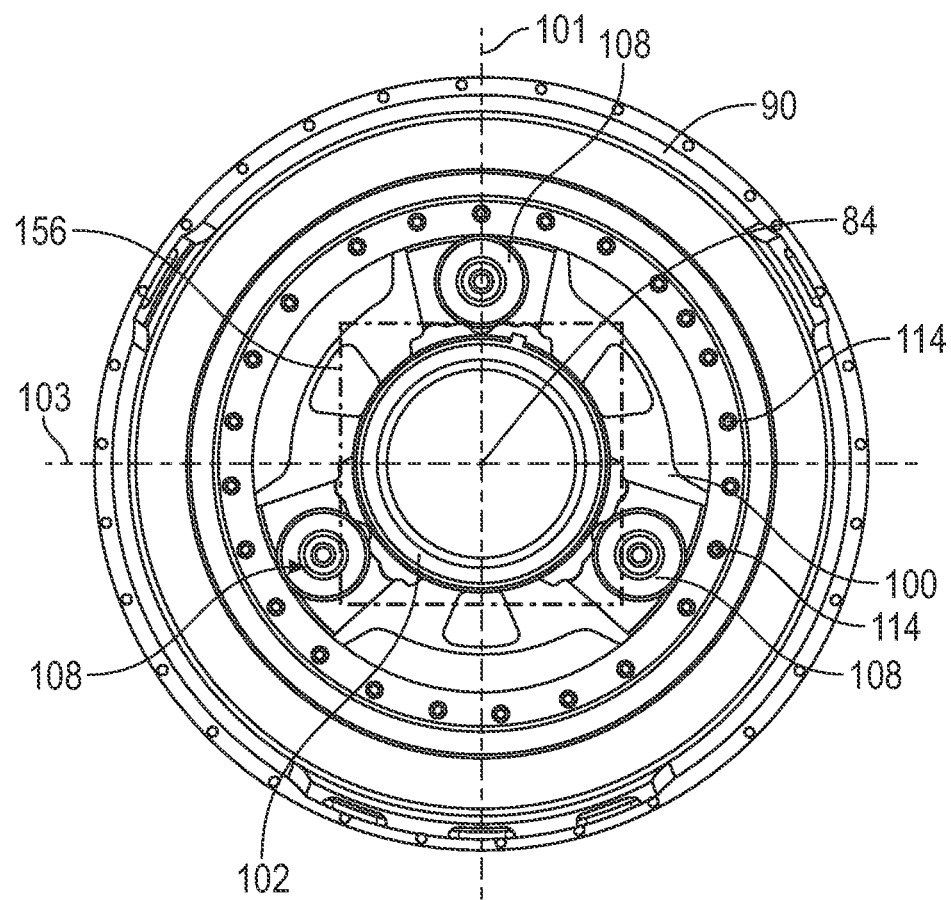
FIG. 6 is a forward-looking view of an aft side of the planetary gear system taken at view 6-6 of FIG. 3, according to an aspect of the present disclosure.
Figure 7:
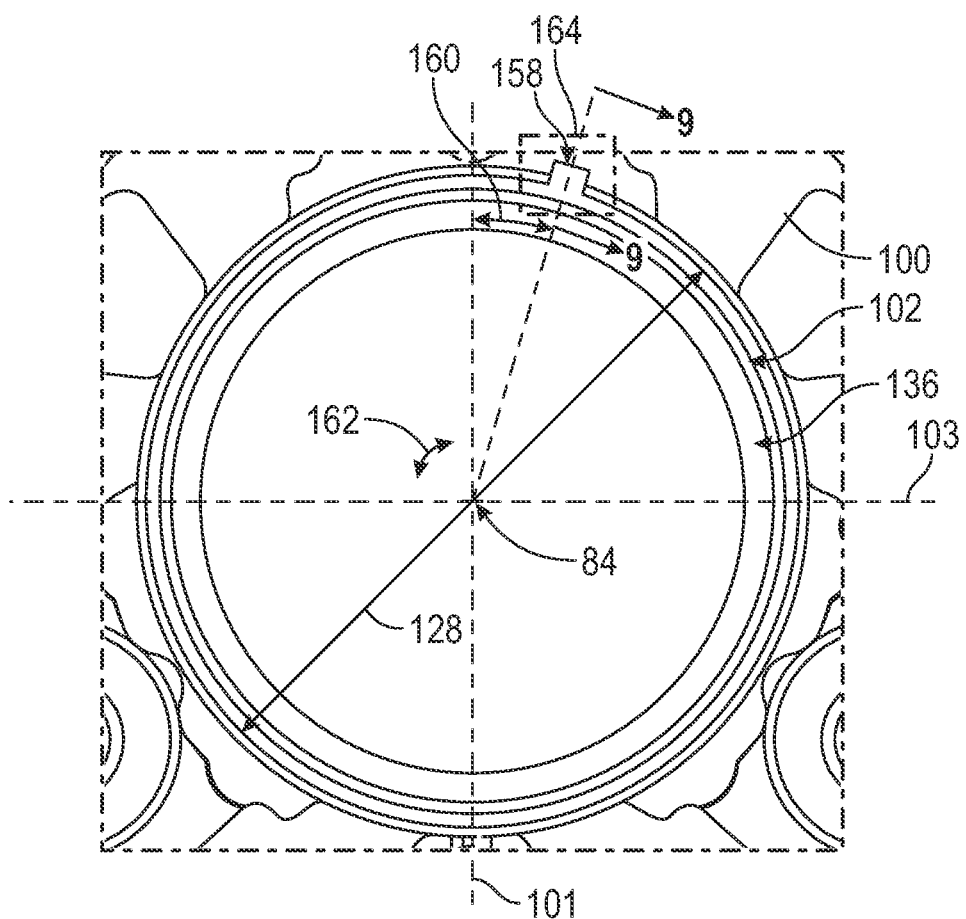
FIG. 7 is an enlarged view of the aft side of the first oil manifold, taken at detail view 156 of FIG. 6, according to an aspect of the present disclosure.

FIG. 6 is a forward-looking view of an aft side of the planetary gear system 40 taken at view 6-6 of FIG. 3, according to an aspect of the present disclosure. FIG. 7 is an enlarged view of the aft side of the first oil manifold 102, taken at detail view 156 of FIG. 6, according to an aspect of the present disclosure. Referring collectively to FIGS. 6 and 7, the first end 136 (i.e., the aft end) of the first oil manifold 102 includes a clocking tab 158 that may be utilized to rotationally locate the first oil manifold 102 in a circumferential direction 162 about the centerline axis 84. The clocking tab 158 may be angularly arranged offset from the vertical reference plane 101 by an angle 160.

Figures 8, 9:
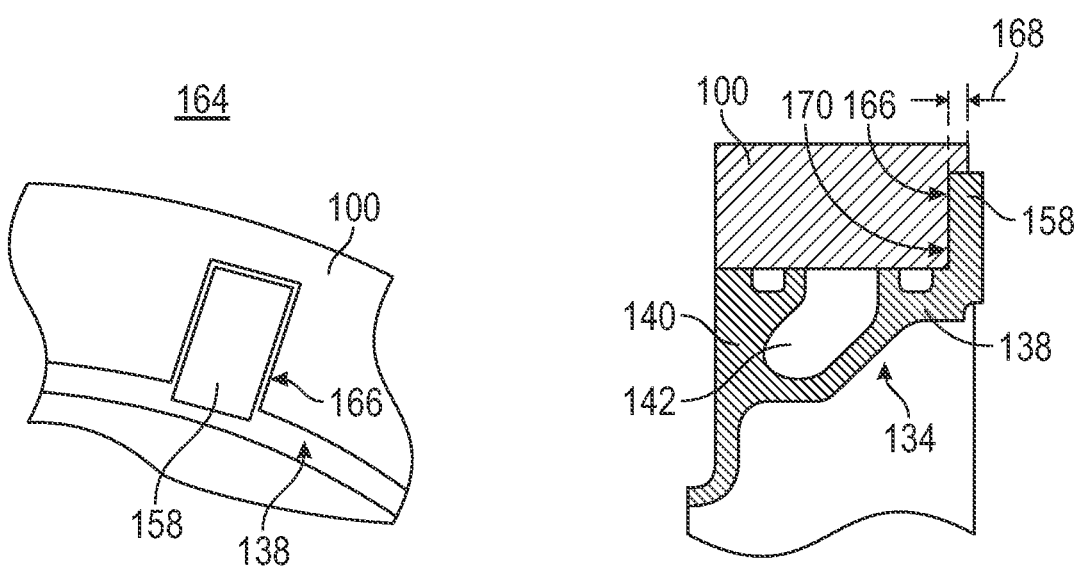
FIG. 8 is an enlarged view of the clocking tab taken at detail view 164 of FIG. 7, according to an aspect of the present disclosure.
FIG. 9 is a partial cross-sectional view of the clocking tab taken at plane 9-9 of FIG. 7, according to an aspect of the present disclosure.

FIG. 8 is an enlarged view of the clocking tab 158 taken at detail view 164 of FIG. 7. FIG. 9 is a partial cross-sectional view of the clocking tab 158 taken at plane 9-9 of FIG. 7. Referring collectively to FIGS. 7 to 9, the carrier 100 includes a clocking tab slot 166 that may be arranged in the carrier 100 to be centered at the angle 160 (FIG. 7). The clocking tab slot 166 may have an axial depth 168 such that, when the first oil manifold 102 is installed in the carrier, an axial clearance 170 is present between the clocking tab 158 and the clocking tab slot 166, thereby permitting axial movement of the first oil manifold 102.

Referring back to FIG. 4, the first oil manifold 102 includes a second flange portion 172 on a second end 174 (e.g., on a forward end) of the first oil manifold 102. FIG. 10 is an enlarged view depicting an engagement of the second flange portion 172 of the first oil manifold 102 and the second oil manifold 104 with the carrier 100, taken at detail view 176 of FIG. 4. Referring collectively to FIGS. 4 and 10, the second flange portion 172 engages with the second oil manifold opening 132 of the carrier 100. More specifically, the second flange portion 172 is sized diametrically so that an outer surface 178 of the second flange portion 172 provides for a slight clearance between the outer surface 178 of the second flange portion 172 and an inner surface 180 of the second oil manifold opening 132 of the carrier 100. The second flange portion 172 may also include a seal groove 182 for accommodating an O-ring seal (not shown). The second flange portion 172 also includes an engagement flange 184 that may extend circumferentially about the centerline axis 84 and extends radially outward of the second flange portion 172. The engagement flange 184 engages with a shoulder 185 of the second oil manifold opening 130 of the carrier 100. Thus, when assembled to the carrier 100 as will be described below, the engagement flange 184 provides for limiting forward axial movement of the first oil manifold 102, while also allowing some freedom of axial movement so that the first oil manifold 102 is installed with a floating connection to the carrier 100.

FIG. 11 is a partial cross-sectional view through the second flange portion 172 of the first oil manifold 102, taken at plane 11-11 of FIG. 4, according to an aspect of the present disclosure. As shown in FIG. 11, the second flange portion 172 includes a first oil manifold mounting flange 186 that extends radially inward of the second flange portion 172. In the FIG. 11 aspect, the first oil manifold mounting flange 186 is shown to comprise a plurality of first oil manifold mounting flange portions 188 that are circumferentially spaced apart from one another about the centerline axis 84. However, the first oil manifold mounting flange 186 may be a continuous first oil manifold mounting flange 186(a) (shown with dashed lines) extending circumferentially about the centerline axis 84 rather than including the plurality of first oil manifold mounting flange portions 188. The continuous first oil manifold mounting flange 186(a), or each of the first oil manifold mounting flange portions 188, may include at least one fastener opening 190 (e.g., a through-hole) for connecting the first oil manifold 102 and the second oil manifold 104, as will be described below.

Referring back to FIGS. 2 to 4, as was described above, the planetary gear system 40 includes the second oil manifold 104. As shown in FIGS. 4 and 10, the second oil manifold 104 includes a second oil manifold flange portion 192 that engages with the second oil manifold opening 132 of the carrier 100. Referring to FIG. 10, the second oil manifold flange portion 192 may include a carrier engagement flange 193 that engages with the second oil manifold opening 132. More specifically, an outer surface 194 of the carrier engagement flange 193 engages with the inner surface 180 of the second oil manifold opening 132 with a slight clearance therebetween. The carrier engagement flange 193 also includes a shoulder 195 that engages with the carrier 100 so as to limit aft movement of the second oil manifold 104. The carrier engagement flange 193 may include a seal groove 196 for accommodating an O-ring seal (not shown) so as to form a sealed connection between the inner surface 180 of the second oil manifold opening 132 and the carrier engagement flange 193.

The second oil manifold flange portion 192 may also include an inner engagement flange 198 that is arranged radially inward of the carrier engagement flange 193, with an oil passageway 200 being defined between the carrier engagement flange 193 and the inner engagement flange 198. The inner engagement flange 198 extends in the axial direction and engages with a coupling flange 202 of the second flange portion 172 of the first oil manifold 102. Both the inner engagement flange 198 and the coupling flange 202 extend circumferentially about the centerline axis 84, and form a sealed connection therebetween. An oil passageway 201 is thus defined between the second flange portion 172 of the first oil manifold 102 and the second oil manifold flange portion 192 of the second oil manifold 104.

Figure 12:
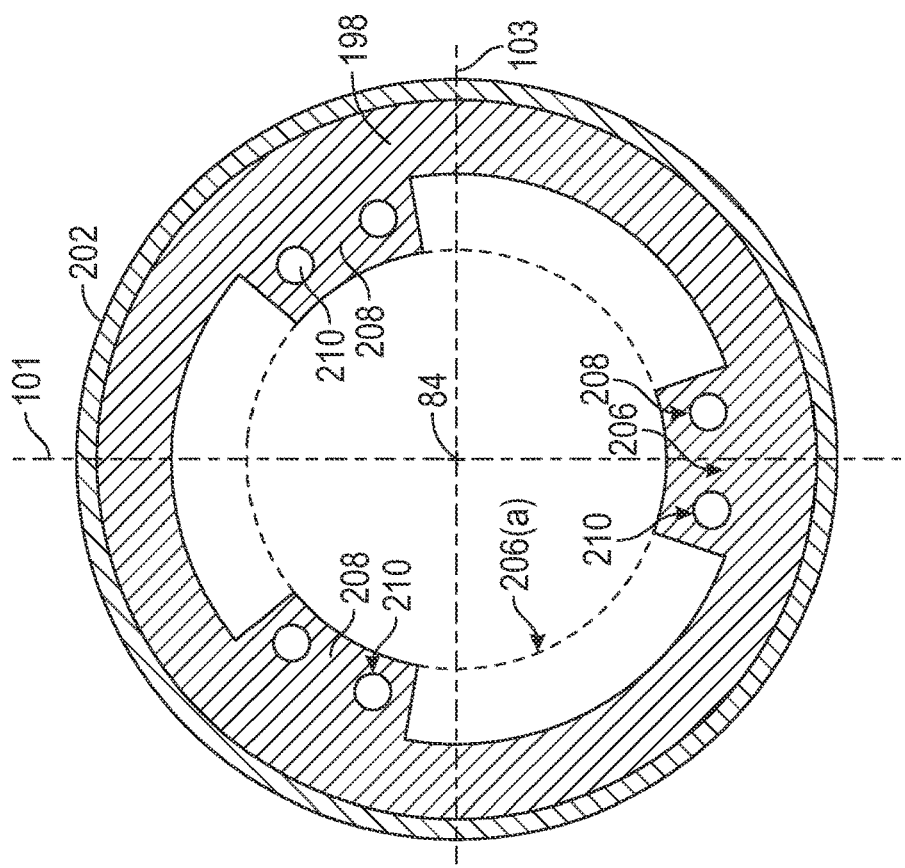
FIG. 12 is a partial cross-sectional view through the second oil manifold flange portion of the second oil manifold, taken at plane 12-12 of FIG. 4, according to an aspect of the present disclosure.

The second oil manifold flange portion 192 also includes a second oil manifold mounting flange 206 that extends radially inward of the second oil manifold flange portion 192. FIG. 12 is a partial cross-sectional view through the second oil manifold flange portion 192 of the second oil manifold 104, taken at plane 12-12 of FIG. 4, according to an aspect of the present disclosure. In the FIG. 12 aspect, the second oil manifold mounting flange 206 is shown to comprise a plurality of second oil manifold mounting flange portions 208 that are circumferentially spaced apart from one another about the centerline axis 84. However, the second oil manifold mounting flange 206 may be a continuous second oil manifold mounting flange 206(a) (shown with dashed lines) extending circumferentially about the centerline axis 84 rather than including the plurality of second oil manifold mounting flange portions 208. The continuous second oil manifold mounting flange 206(a), or each of the second oil manifold mounting flange portions 208, may include at least one fastener opening 210 (e.g., a through-hole) for connecting the second oil manifold 104 and the first oil manifold 102, as will be described below.

In assembling the carrier 100, the first oil manifold 102, and the second oil manifold 104, the first oil manifold 102 is inserted from the first side 126 of the carrier 100 through the first oil manifold opening 128, with the clocking tab 158 being arranged within the clocking tab slot 166 (FIG. 8). The second oil manifold 104 is inserted from the second side 130 of the carrier 100 through the second oil manifold opening 132 of the carrier 100. The second oil manifold 104 is aligned so the oil distributing portions 109 (FIG. 3) engage with the respective planet gear shafts 108, and so that the fastener openings 210 align with the fastener openings 190 of the first oil manifold mounting flange portions 188. As shown in FIG. 10, the first oil manifold mounting flange 186 and the second oil manifold mounting flange 206 are connected together by at least one connecting member 212 so as to mount the first oil manifold 102 and the second oil manifold 104 to the carrier 100. More specifically, each connecting member 212 may comprise a bolt 214 that is inserted through the fastener opening 210 (FIG. 12) of the second oil manifold mounting flange portions 208 and through the fastener opening 190 (FIG. 11) of the first oil manifold mounting flange portions 188, with a nut 216 then being engaged with the bolt 214. The engagement flange 184 of the first oil manifold 102 engages with the carrier 100, and the shoulder 195 of the engagement flange 193 of the second oil manifold 104 engages with the carrier 100 so as to provide axial limits on forward and aft movement of the connected first oil manifold 102 and the second oil manifold 104. Thus, the first oil manifold 102 and the second oil manifold 104 are mounted to the carrier 100 with a floating connection (i.e., a connection that allows for more freedom of expansion axially) that allows for better accommodation of temperature changes between component parts of the planetary gear system 40. As a result, lighter weight materials may be implemented for the first oil manifold 102 and the second oil manifold 104. In addition, a less complex mounting structure is provided so as to provide reduced weight by omitting mounting bosses that may otherwise be required to bolt the first oil manifold and/or the second oil manifold to the carrier.

Figure 13:
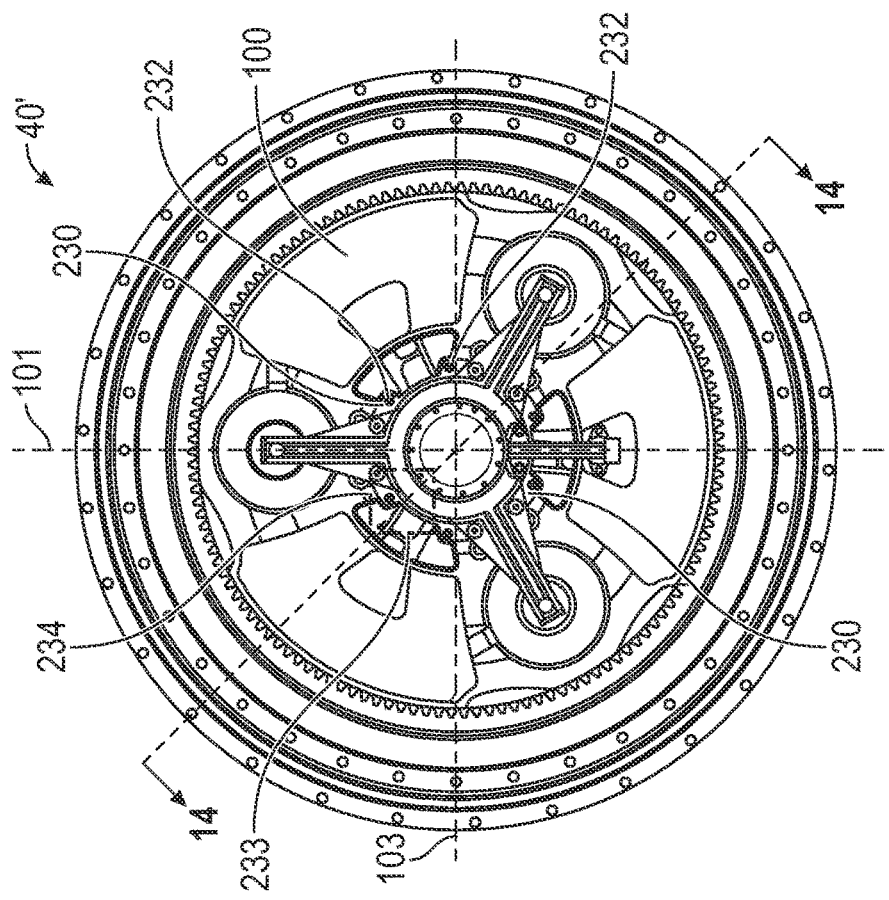
FIG. 13 is an alternate aft looking view, similar to FIG. 2, of another exemplary planetary gear system, according to an aspect of the present disclosure.
Figure 14:
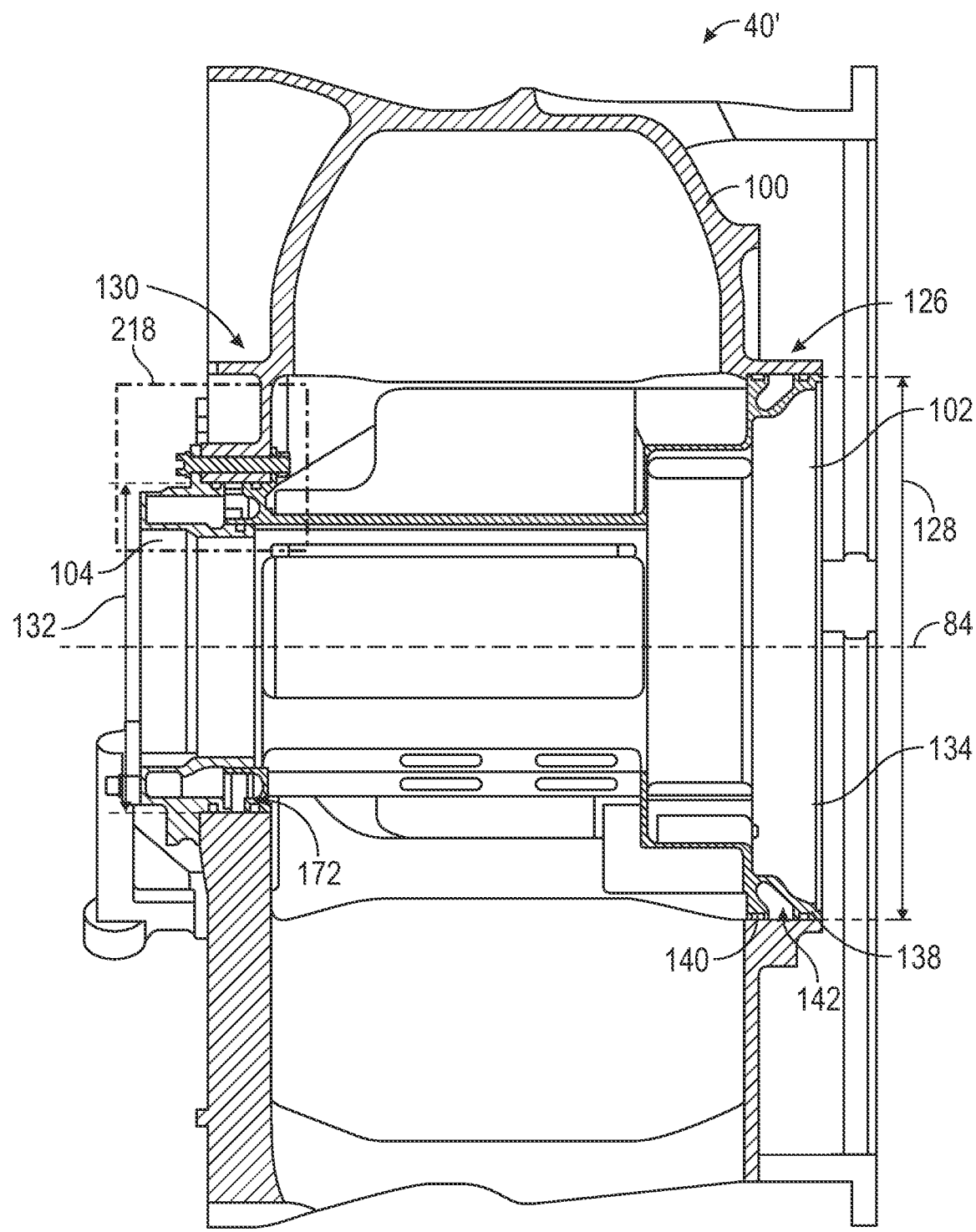
FIG. 14 is a partial cross-sectional view of the carrier, the first oil manifold, and the second oil manifold, with the other planetary gear components removed similar to FIG. 4, taken at plane 14-14 of FIG. 13, according to an aspect of the present disclosure.

In the foregoing aspects of FIGS. 2 through 12, the first oil manifold 102 and the second oil manifold 104 are shown as being connected via the first oil manifold mounting flange 186 and the second oil manifold mounting flange 206 with each extending radially inward. In the following description, an aspect of the present disclosure will be described in which the first oil manifold 102 and the second oil manifold 104 are connected via flanges that extend radially outward. FIG. 13 is an alternate aft looking view similar to FIG. 2 of another exemplary alternate planetary gear system 40', according to an aspect of the present disclosure. In FIG. 13, as well as in FIG. 14 and FIG. 15, like reference numerals are included for parts common to both the planetary gear system 40 and the alternate planetary gear system 40'. FIG. 14 is a partial cross-sectional view of the carrier 100, the first oil manifold 102, and the second oil manifold 104, with the other planetary gear components removed similar to that shown in FIG. 4, taken at plane 14-14 of FIG. 13. In the FIG. 13 and FIG. 14 aspects, the first oil manifold 102 includes the first flange portion 134 that is the same as that described above in FIG. 4. Therefore, the description provided above with regard to the first flange portion 134 with regard to FIGS. 4 and 5 is equally applicable for FIG. 14 and will not be repeated. One difference, however, between the first oil manifold 102 of FIGS. 13 and 14 may be that the clocking tab 158 (FIGS. 6 to 9) may be omitted, and the first oil manifold 102 may be clocked differently as will be described below.

Figure 15:
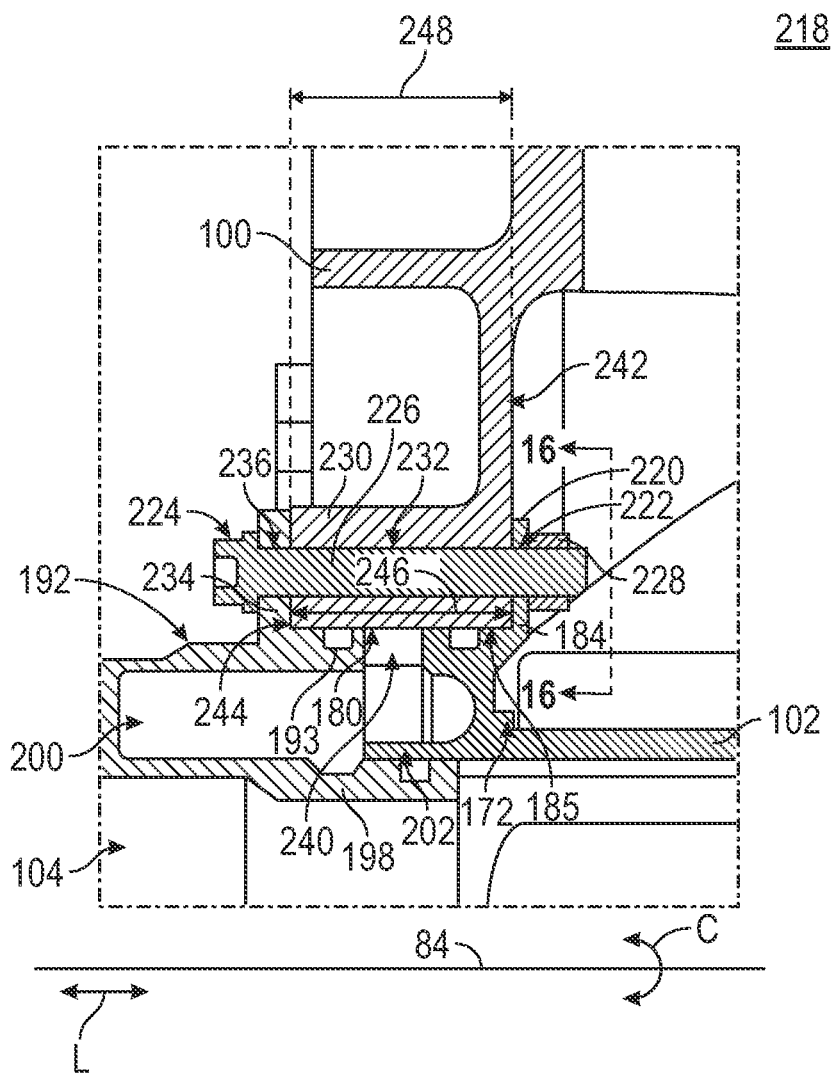
FIG. 15 is an enlarged view depicting engagement of the second flange portion of the first oil manifold and the second oil manifold, with the carrier, taken at detail view 218 of FIG. 14, according to an aspect of the present disclosure.
Figure 16:
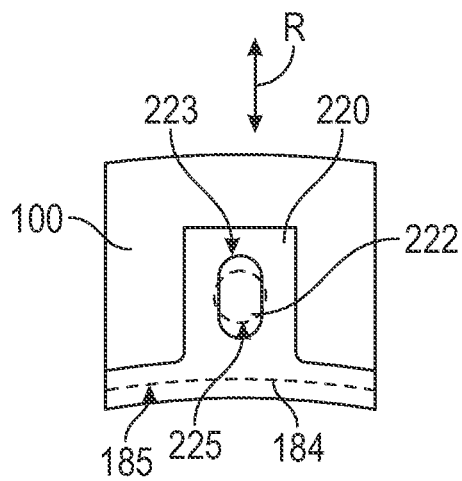
FIG. 16 is a side view of a first oil manifold mounting flange taken at view 16-16 of FIG. 15, according to an aspect of the present disclosure.

FIG. 15 is an enlarged view depicting engagement of the second flange portion 172 of the first oil manifold 102, and the second oil manifold 104, with the carrier 100, taken at detail view 218 of FIG. 14. FIG. 16 is a side view of a first oil manifold mounting flange taken at view 16-16 of FIG. 15. Referring collectively to FIGS. 14 to 16, the second flange portion 172 is similar to the second flange portion 172 described above with regard to FIG. 10, and, therefore, like components are numbered accordingly. In the present aspect, however, the second flange portion 172 includes a first oil manifold mounting flange 220 that extends radially outward of the second flange portion 172. More particularly, the second flange portion 172 includes the engagement flange 184 that extends circumferentially about the centerline axis 84 as was described above with regard to FIG. 10, but includes the first oil manifold mounting flange 220 extending radially outward from the engagement flange 184. The first oil manifold mounting flange 220 may include a fastener opening 222 for accommodating a connecting member 224 therethrough (in FIG. 16, the connecting member 224 has been removed). The fastener opening 222 may be a slotted opening 223 that is slotted in the radial direction so as to allow radial movement of the first oil manifold 102. Alternatively, the fastener opening 222 may be a through-hole 225, or the through-hole 225 may be internally threaded to threadedly engage with the connecting member 224. In addition, in the present aspect of FIG. 15, the second flange portion 172 includes an axial spacing flange member 240 that extends in the longitudinal direction and also extends in the circumferential direction about the centerline axis 84.

Figure 17:
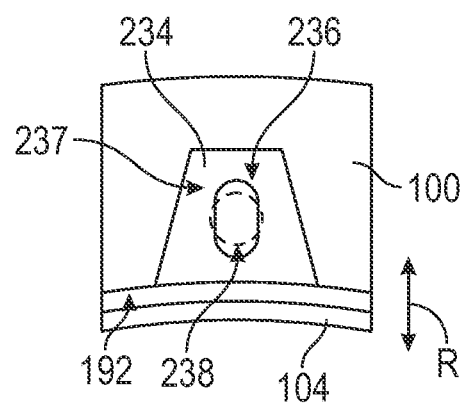
FIG. 17 is an enlarged view of the second oil mounting flange taken at detail view 233 of FIG. 13, with the connecting member removed, according to an aspect of the present disclosure.

The second oil manifold 104 is also similar to the second oil manifold 104 described above with regard to FIG. 10 and, therefore, like components are numbered accordingly. However, rather than including the second oil manifold mounting flange 206 extending radially inward, the second oil manifold 104 of the present aspect in FIG. 15 includes a second oil manifold mounting flange 234 that extends radially outward from the second oil manifold flange portion 192. FIG. 17 is an enlarged view of the second oil manifold mounting flange 234 taken at detail view 233 of FIG. 13, with the connecting member 224 removed. The second oil manifold mounting flange 234 includes a fastener opening 236 therethrough for accommodating the connecting member 224. Similar to the fastener opening 222 (FIG. 16), the fastener opening 236 may be a slotted opening 237 that is slotted in the radial direction. Alternatively, the fastener opening 236 may be a through-hole 238, or the through-hole 238 may be internally threaded. While FIG. 13 and FIG. 17 depict one second oil manifold mounting flange 234, the second oil manifold 104 may include more than one second oil manifold mounting flange 234 circumferentially spaced about the centerline axis 84. For example, as shown in FIG. 13, the carrier 100 may include a plurality of oil manifold mounting portions 230 circumferentially spaced about the centerline axis 84, where each oil manifold mounting portion 230 includes a respective fastener opening 232 therethrough. The second oil manifold 104 may include a respective second oil manifold mounting flange 234 for each respective oil manifold mounting portion 230 of the carrier 100.

Returning to FIG. 15, in the present aspect, the carrier 100 includes an oil manifold mounting portion 230 that includes a fastener opening 232 therethrough for accommodating the connecting member 224 therethrough. The fastener opening 232 may be arranged circumferentially at the angle 160 (FIG. 7) similar to the clocking tab 158 so as to provide circumferential clocking of the first oil manifold 102 and the second oil manifold 104. Similar to the slotted opening 223 (FIG. 16) and the slotted opening 237 (FIG. 17), the fastener opening 232 in the oil manifold mounting portion 230 may also be a slotted opening that is slotted in the radial direction. Alternatively, the fastener opening 232 may be a through-hole.

In assembling the carrier 100, the first oil manifold 102, and the second oil manifold 104, according to the present alternate aspect, the first oil manifold 102 is inserted from the first side 126 (FIG. 14) of the carrier 100 through the first oil manifold opening 128 (FIG. 14), with the fastener opening 222 of the first oil manifold mounting flange 220 being aligned with the fastener opening 232 of the oil manifold mounting portion 230 of the carrier 100. Similarly, the second oil manifold 104 is inserted from the second side 130 (FIG. 14) of the carrier 100 through the second oil manifold opening 132 (FIG. 14) of the carrier 100, with the fastener opening 236 of the second oil manifold mounting flange 234 being aligned with the fastener opening 232 of the oil manifold mounting portion 230 of the carrier 100. Thus, the first oil manifold mounting flange 220 of the first oil manifold 102 is arranged on a first side 242 of the oil manifold mounting portion 230 of the carrier 100, and the second oil manifold mounting flange 234 is arranged on a second side 244 of the oil manifold mounting portion 230 of the carrier 100. The connecting member 224 (e.g., the bolt 226) is inserted through the fastener opening 236 of the second oil manifold mounting flange 234, through the fastener opening 232 of the oil manifold mounting portion 230 of the carrier 100, and through the fastener opening 236 of the first oil manifold mounting flange 220, and the nut 228 is installed on the bolt 226. The axial spacing flange member 240 of the second flange portion 172 butts against the carrier engagement flange 193 of the second oil manifold flange portion 192 so that a spacing 246 between the first oil manifold mounting flange 220 and the second oil manifold mounting flange 234 is slightly greater than a thickness 248 of the oil manifold mounting portion 230, thereby allowing for axial movement of the first oil manifold 102 and the second oil manifold 104.

Each of the foregoing aspects provides for a floating oil manifold in a planetary gear system that maintains a two manifold configuration, but one in which the two manifolds are bolted to each other, rather than both manifolds being rigidly constrained to the carrier. This configuration allows for a simpler carrier manufacturing (e.g., allows for less bolt mounting bosses and threads being machined into the carrier) and allows for lower weight due to fewer parts in the overall gear system (e.g., less inserts provided in the mounting bosses and less mounting bolts/washers). Further, the present configuration allows for better differential thermal growth between the two oil manifolds and the carrier, thereby enabling the implementation of a different and lighter material for the manifolds (e.g., aluminum) than that used for the carrier.

Furthermore, since the carrier structure is subjected to deformations during normal operation, the present floating two oil manifold configuration does not impact the planet carrier behavior. The present two oil manifold configuration can more readily accommodate the carrier's deformations due to both mechanical and thermal loads without impacting the carrier's natural behavior.

While the foregoing description relates generally to a gas turbine engine, the gas turbine engine may be implemented in various environments. For example, the engine may be implemented in an aircraft, but may also be implemented in non-aircraft applications, such as power generating stations, marine applications, or oil and gas production applications. Thus, the present disclosure is not limited to use in aircraft.

Further aspects of the present disclosure are provided by the subject matter of the following clauses.

A planetary gear system includes a carrier for mounting a plurality of planet gears, the carrier including a first side having a first oil manifold opening therethrough, and a second side having a second oil manifold opening therethrough, a first oil manifold having a first flange portion on a first end of the first oil manifold, the first flange portion floatingly engaging with the first oil manifold opening of the carrier, and a second flange portion on a second end of the first oil manifold, the second flange portion engaging with the second oil manifold opening of the carrier, the second flange portion including a first oil manifold mounting flange, a second oil manifold having a second oil manifold flange portion engaging with the second oil manifold opening of the carrier, the second oil manifold flange portion including a second oil manifold mounting flange, and at least one connecting member connected with the first oil manifold mounting flange and the second oil manifold mounting flange so as to mount the first oil manifold and the second oil manifold to the carrier.

The planetary gear system according to the preceding clause, wherein the first flange portion includes at least one clocking tab that engages with the carrier.

The planetary gear system according to any preceding clause, wherein the first flange portion includes a first flange and a second flange defining an oil passageway therebetween, the first flange and the second flange engaging with an inner surface of the first oil manifold opening of the carrier.

The planetary gear system according to any preceding clause, wherein the second flange portion of the first oil manifold and the second oil manifold flange portion define an oil passageway therebetween.

The planetary gear system according to any preceding clause, wherein the first oil manifold mounting flange extends radially inward of the second flange portion, and the second oil manifold mounting flange extends radially inward of the second oil manifold flange portion.

The planetary gear system according to any preceding clause, wherein the first oil manifold mounting flange and the second oil manifold mounting flange are connected together via the at least one connecting member.

The planetary gear system according to any preceding clause, wherein the second flange portion includes an engagement flange extending radially outward of the second flange portion, the engagement flange engaging with a shoulder of the second oil manifold opening of the carrier.

The planetary gear system according to any preceding clause, wherein the first oil manifold mounting flange comprises a plurality of first oil manifold mounting flange portions circumferentially spaced apart, and the second oil manifold mounting flange comprises a plurality of second oil manifold mounting flange portions circumferentially spaced apart.

The planetary gear system according to any preceding clause, wherein the first oil manifold mounting flange extends radially outward of the second flange portion, and the second oil manifold mounting flange extends radially outward of the second oil manifold flange portion.

The planetary gear system according to any preceding clause, wherein the carrier includes an oil manifold mounting portion, and the first oil manifold mounting flange is arranged on a first side of the oil manifold mounting portion and the second oil manifold mounting flange is arranged on a second side of the oil manifold mounting portion, the at least one connecting member connecting the first oil manifold mounting flange and the second oil manifold mounting flange to the carrier.

The planetary gear system according to any preceding clause, wherein the at least one connecting member extends through the first oil manifold mounting flange, through the oil manifold mounting portion, and through the second oil manifold mounting flange.

The planetary gear system according to any preceding clause, wherein first oil manifold mounting flange includes a first fastener opening therethrough, and the second oil manifold mounting flange includes a second fastener opening therethrough, and one of the first fastener opening and the second fastener opening is a through-hole, and the other of the first fastener opening and the second fastener opening is internally threaded.

The planetary gear system according to any preceding clause, wherein the carrier is mounted stationary within the planetary gear system.

The planetary gear system according to any preceding clause, further comprising a plurality of planet gears each mounted to the carrier via a respective planet gear shaft, the second oil manifold including a plurality of oil distributing portions, each oil distributing portion being connected with a respective planet gear shaft.

A gas turbine engine including a fan assembly, and a planetary gear system for driving the fan assembly, the planetary gear system including (a) a carrier mounting a plurality of planet gears, the carrier including a first side having a first oil manifold opening therethrough, and a second side having a second oil manifold opening therethrough, (b) a first oil manifold having a first flange portion on a first end of the first oil manifold, the first flange portion floatingly engaging with the first oil manifold opening of the carrier, and a second flange portion on a second end of the first oil manifold, the second flange portion engaging with the second oil manifold opening of the carrier, and the second flange portion including a first oil manifold mounting flange, (c) a second oil manifold having a second oil manifold flange portion engaging with the second oil manifold opening of the carrier, the second oil manifold flange portion including a second oil manifold mounting flange, and (d) at least one connecting member connected with the first oil manifold mounting flange and the second oil manifold mounting flange so as to mount the first oil manifold and the second oil manifold to the carrier.

The gas turbine engine according to the preceding clause, wherein the plurality of planet gears are each mounted to the carrier via a respective planet gear shaft, the second oil manifold including a plurality of oil distributing portions, each oil distributing portion being connected with a respective planet gear shaft.

The gas turbine engine according to any preceding clause, wherein the first oil manifold mounting flange extends radially inward of the second flange portion, and the second oil manifold mounting flange extends radially inward of the second oil manifold flange portion.

The gas turbine engine according to any preceding clause, wherein the first oil manifold mounting flange and the second oil manifold mounting flange are connected together via the at least one connecting member.

The gas turbine engine according to any preceding clause, wherein the first oil manifold mounting flange extends radially outward of the second flange portion, and the second oil manifold mounting flange extends radially outward of the second oil manifold flange portion.

The gas turbine engine according to any preceding clause, wherein the carrier includes an oil manifold mounting portion, and the first oil manifold mounting flange is arranged on a first side of the oil manifold mounting portion and the second oil manifold mounting flange is arranged on a second side of the oil manifold mounting portion, the at least one connecting member connecting the first oil manifold mounting flange and the second oil manifold mounting flange to the carrier.

Although the foregoing description is directed to some exemplary embodiments of the present disclosure, other variations and modifications will be apparent to those skilled in the art, and may be made without departing from the spirit or the scope of the disclosure. Moreover, features described in connection with one embodiment of the present disclosure may be used in conjunction with other embodiments, even if not explicitly stated above.

We claim:

1. A planetary gear system comprising:
    a carrier for mounting a plurality of planet gears, the carrier including a first side having a first oil manifold opening therethrough having a first oil manifold opening inner surface, and a second side having a second oil manifold opening therethrough having a second oil manifold opening inner surface, a system centerline axis being defined extending through the first oil manifold opening and the second oil manifold opening, the first oil manifold opening and the second oil manifold opening extending circumferentially about the system centerline axis, and each of the plurality of planet gears being mounted with a planet gear centerline axis thereof radially offset from the system centerline axis;
    a first oil manifold having a first flange portion on a first end of the first oil manifold, the first flange portion extending circumferentially about the system centerline axis and having a first flange with a first flange seal groove and a second flange with a second flange seal groove, the second flange being longitudinally spaced apart from the first flange with respect to the system centerline axis, the first flange and the second flange of the first flange portion floatingly engaging with the first oil manifold opening inner surface, and a second flange portion on a second end of the first oil manifold, the second flange portion engaging with the second oil manifold opening of the carrier, the second flange portion including a first oil manifold mounting flange;
    a second oil manifold having a second oil manifold flange portion extending circumferentially about the system centerline axis and engaging with the second oil manifold opening inner surface, the second oil manifold flange portion including a second oil manifold mounting flange; and
    at least one connecting member connected with the first oil manifold mounting flange and the second oil manifold mounting flange so as to mount the first oil manifold and the second oil manifold to the carrier.

2. The planetary gear system according to claim 1, wherein the first flange portion includes at least one clocking tab that engages with the carrier.

3. The planetary gear system according to claim 1, wherein the first flange and the second flange of the first flange portion define an oil passageway therebetween.

4. The planetary gear system according to claim 1, wherein the second flange portion of the first oil manifold and the second oil manifold flange portion define an oil passageway therebetween.

5. The planetary gear system according to claim 1, wherein the first oil manifold mounting flange extends radially inward, with respect to the system centerline axis, of the second flange portion, and the second oil manifold mounting flange extends radially inward, with respect to the system centerline axis, of the second oil manifold flange portion.

6. The planetary gear system according to claim 5, wherein the first oil manifold mounting flange and the second oil manifold mounting flange are connected together via the at least one connecting member.

7. The planetary gear system according to claim 5, wherein the second flange portion includes an engagement flange extending radially outward, with respect to the system centerline axis, of the second flange portion, the engagement flange engaging with a shoulder of the second oil manifold opening of the carrier.

8. The planetary gear system according to claim 5, wherein the first oil manifold mounting flange comprises a plurality of first oil manifold mounting flange portions circumferentially spaced apart with respect to the system centerline axis, and the second oil manifold mounting flange comprises a plurality of second oil manifold mounting flange portions circumferentially spaced apart, with respect to the system centerline axis.

9. The planetary gear system according to claim 1, wherein the first oil manifold mounting flange extends radially outward, with respect to the system centerline axis, of the second flange portion, and the second oil manifold mounting flange extends radially outward, with respect to the system centerline axis, of the second oil manifold flange portion.

10. The planetary gear system according to claim 9, wherein the carrier includes an oil manifold mounting portion, and the first oil manifold mounting flange is arranged on a first side of the oil manifold mounting portion and the second oil manifold mounting flange is arranged on a second side of the oil manifold mounting portion, the at least one connecting member connecting the first oil manifold mounting flange and the second oil manifold mounting flange to the carrier.

11. The planetary gear system according to claim 10, wherein the at least one connecting member extends through the first oil manifold mounting flange, through the oil manifold mounting portion, and through the second oil manifold mounting flange.

12. The planetary gear system according to claim 10, wherein the first oil manifold mounting flange includes a first fastener opening therethrough, and the second oil manifold mounting flange includes a second fastener opening therethrough, and one of the first fastener opening or the second fastener opening is a through-hole, and the other of the first fastener opening or the second fastener opening is internally threaded.

13. The planetary gear system according to claim 1, wherein the carrier is mounted stationary within the planetary gear system.

14. The planetary gear system according to claim 13, further comprising a plurality of planet gears each mounted to the carrier via a respective planet gear shaft, the second oil manifold including a plurality of oil distributing portions, each oil distributing portion being connected with a respective planet gear shaft.

15. A gas turbine engine comprising:
    a fan assembly; and
    a planetary gear system for driving the fan assembly, the planetary gear system comprising:

(a) a carrier mounting a plurality of planet gears, the carrier including a first side having a first oil manifold opening therethrough and having a first oil manifold inner surface, and a second side having a second oil manifold opening therethrough and having a second oil manifold opening inner surface, a system centerline axis being defined extending through the first oil manifold opening and the second oil manifold opening, the first oil manifold opening and the second oil manifold opening extending circumferentially about the system centerline axis, and each of the plurality of planet gears being mounted with a planet gear centerline axis thereof radially offset from the system centerline axis;

(b) a first oil manifold having a first flange portion on a first end of the first oil manifold, the first flange portion extending circumferentially about the system centerline axis and having a first flange with a first flange seal groove and a second flange with a second flange seal groove, the second flange being longitudinally spaced apart from the first flange with respect to the system centerline axis, the first flange and the second flange of the first flange portion floatingly engaging with the first oil manifold opening inner surface, and a second flange portion on a second end of the first oil manifold, the second flange portion engaging with the second oil manifold opening of the carrier, and the second flange portion including a first oil manifold mounting flange;

(c) a second oil manifold having a second oil manifold flange portion extending circumferentially about the system centerline axis and engaging with the second oil manifold opening inner surface, the second oil manifold flange portion including a second oil manifold mounting flange; and (d) at least one connecting member connected with the first oil manifold mounting flange and the second oil manifold mounting flange so as to mount the first oil manifold and the second oil manifold to the carrier.

16. The gas turbine engine according to claim 15, wherein the plurality of planet gears are each mounted to the carrier via a respective planet gear shaft, the second oil manifold including a plurality of oil distributing portions, each oil distributing portion being connected with a respective planet gear shaft.

17. The gas turbine engine according to claim 15, wherein the first oil manifold mounting flange extends radially inward, with respect to the system centerline axis, of the second flange portion, and the second oil manifold mounting flange extends radially inward, with respect to the system centerline axis, of the second oil manifold flange portion.

18. The gas turbine engine according to claim 17, wherein the first oil manifold mounting flange and the second oil manifold mounting flange are connected together via the at least one connecting member.

19. The gas turbine engine according to claim 15, wherein the first oil manifold mounting flange extends radially outward, with respect to the system centerline axis, of the second flange portion, and the second oil manifold mounting flange extends radially outward, with respect to the system centerline axis, of the second oil manifold flange portion.

20. The gas turbine engine according to claim 19, wherein the carrier includes an oil manifold mounting portion, and the first oil manifold mounting flange is arranged on a first side of the oil manifold mounting portion and the second oil manifold mounting flange is arranged on a second side of the oil manifold mounting portion, the at least one connecting member connecting the first oil manifold mounting flange and the second oil manifold mounting flange to the carrier.

* * * * *